3,655,616
STABILIZED HALOGEN-CONTAINING RESINS

James T. Freeze, Huntington, N.Y., and Alan L. Fikes, Dublin, Calif., assignors to Pfizer Inc., New York, N.Y.
No Drawing. Continuation of application Ser. No. 598,942, Dec. 5, 1966, which is a continuation-in-part of application Ser. No. 398,065, Sept. 21, 1964. This application Oct. 20, 1970, Ser. No. 82,519
Int. Cl. C08f 45/62
U.S. Cl. 260—45.75 K                                2 Claims

ABSTRACT OF THE DISCLOSURE

Mixtures of sulfur-containing organo-tin compounds and organo-tin maleates as stabilizers for halogen-containing resins.

---

This application is a continuation of application Ser. No. 598,942 filed Dec. 5, 1966 and now abandoned and said latter application was a continuation-in-part of application Ser. No. 398,065 filed Sept. 21, 1964 and now abandoned.

This invention relates to stabilized plastic compositions. More particularly, it is concerned with heat and light resistant halogen-containing resins containing, as stabilizers, organo-tin derivatives of sulfur compounds and of maleic acid and its esters.

It is a matter of common knowledge and experience that heat and light, individually and collectively, have a harmful effect on halogen-containing resins. For example, polymers of vinyl chloride and copolymers of vinyl chloride with other polymerizable monomers show a strong tendency to darken and lose their desirable physical properties when exposed to light or to heat. These effects have limited the usefulness of such resins, especially where it has been necessary to heat the materials to compound them with other ingredients on a plastics mill, for example, or where it is the usual practice to expose articles fabricated from such resins to light.

The instability of these resins has been overcome in the art by adding to them certain chemical materials, known as stabilizers. Especially noteworthy and efficient resin stabilizers are organo metallic compounds derived from tin. Special mention is made of two classes of organo-tin compounds which have been found to impart exceptional stability to halogen-containing resins against the deteriorative effects of heat and light: sulfur-containing organo-tin stabilizers such as organo-tin mercaptides, organo-tin mercapto esters, organo-tin mercapto alcohols, and the like; and organo-tin maleate stabilizers.

While these two classes of organo-tin stabilizers have been employed separately in the heat and light stable compositions developed in the art, it has now been found that using them together, in the same plastic composition, within the precise limitations to be described hereinafter, provides a truly remarkable synergistic effect. Thus, it is observed that the stability of halogen-containing resins is so improved by adding these mixtures of stabilizers that for the first time there are obtained plastic compositions with properties more useful than those stabilized with equal amounts of the organo-tin compounds individually. This discovery also provides economic advantages to resin compounders, who may now select stabilizers from each class, combining them on the basis of lowest ultimate cost and still obtain heat and light stability adequate for the fabricated end-use contemplated for the plastic.

It is, accordingly, a principal object of the instant invention to provide improved plastic compositions.

It is a further object of the instant invention to provide plastic compositions with improved resistance to heat and light.

It is a still further object of the instant invention to provide stabilized halogen-containing resin compositions more economically than heretofore.

These and other objects readily apparent to those skilled in the art reside in the novel compositions of the instant invention which are, in essence: Plastic compositions stabilized against heat and light, including as an essential constituent a halogen-containing resin, a sulfur containing stabilizer selected from the group consisting of organo-tin mercaptides, organo-tin mercapto esters and organo-tin mercapto alcohols, and for each part by weight of said stabilizer from about 1 to about 4 parts by weight of an organo-tin maleate stabilizer.

The halogen-containing resins contemplated by the instant invention include those containing a plurality of vinyl chloride units such as polymers of vinyl chloride and conjoint polymers of vinyl chloride with another polymerizable compound, for example, copolymers of vinyl chloride with esters of acrylic and methacrylic acids, and with acrylonitrile; copolymers of vinyl chloride with vinyl esters of aliphatic acids, particularly vinyl acetate; copolymers of vinyl chloride with diene compounds and unsaturated dicarboxylic acids or their anhydrides, such as copolymers of vinyl chloride with diethyl maleate, diethyl fumarate or maleic anhydride; after-chlorinated polymers and copolymers of vinyl chloride; copolymers of vinyl chloride and vinylidene chloride with unsaturated aldehydes, ketones and others, such as acrolein, crotonaldehyde, methyl vinyl ketone, methyl vinyl ether, isobutyl vinyl ether, and the like; polymers of vinylidene chloride and copolymers of the same with vinyl chloride and other polymerizable compounds; polymers of vinyl chloroacetate and dichlordivinyl ether; chlorinated polymers of vinyl acetate; chlorinated polymeric esters of acrylic and alpha-substituted acrylic acids; polymers of chlorinated styrenes, for example, dichlorostyrene; chlorinated rubber; chlorinated polymers of ethylene; polymers and after-chlorinated polymers of chlorobutadienes, and their copolymers with vinyl chloride; rubber hydrochloride and chlorinated rubber hydrochloride; and mixtures of the polymers recited herein with each other or other polymerizable compounds. The corresponding bromides and fluorides lend themselves equally well to the preparation of the valuable new plastic compositions.

Special mention is made of a particularly effective embodiment of the instant invention; these are plastics compositions wherein the said sulfur-containing stabilizer is a compound of the formula

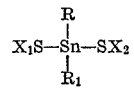

wherein R and $R_1$ are monovalent hydrocarbon radicals and $SX_1$ and $SX_2$ are radicals of a mercapto compound selected from the group consisting of aliphatic mercaptans having up to 18 carbon atoms, aromatic mercaptans, monohydric and polyhydric mercaptoalcohols and mercaptoalcohol esters, mercapto acids and mercapto acid esters. R and $R_1$ may be aliphatic, aromatic, or alicyclic groups, such as methyl, ethyl propyl, butyl, amyl, hexyl, octyl, lauryl, allyl, benzyl, phenyl, tolyl, cyclohexyl, and the like.

Suitable sources for the radicals $SX_1$ and $SX_2$ are aliphatic and aromatic mercaptans having from up to 18 carbon atoms, for example, butyl, decyl and dodecyl mercaptan, thionaphthol, thiobenzyl alcohol, phenoxyethyl, mercaptan, and the like. Radicals $SX_1$ and $SX_2$ can also be derived from mercapto alcohols, such as mono thioethylene glycol, mono thiopropylene glycol, thioglycerol, thiodiethylene, glycol, and esters of the mercaptoethanols such as thioglycol 2-ethyl hexoic acid esters, and the like. Furthermore, radicals $SX_1$ and $SX_2$ can be derived from the esters of mono and dibasic aliphatic and aromatic acids, such as thioglycolic acid esters and esters of beta thiopropionic acid, thiolactic acid, thiobutyric acid, alpha mercapto lauric acid, thiomalic acid, thiosalicylic acid, and the like. Especially useful as sulfur-containing stabilizers are dialkyl tin bis-thiozbenzoates, dialkyl tin bis-2-ethyl-hexylthioglycolate and dialkyl tin bis-laurylmercaptide. These compounds are readily available commercially in some instances and all can be made by techniques familiar to those skilled in the art. In this connection, reference is made to Smith, "Organotin Stabilizers," Tin Research Institute, Middlesex, England, 1959, especially pp. 15–20, which provides reference to procedures for preparing the aforesaid organo-tin compounds, and to Mack et al., U.S. 2,914,506.

The instant invention also contemplates, in one of its embodiments, plastic compositions of the aforementioned type in which the said organo-tin maleate stabilizer is a compound selected from the group consisting of those of the formulas

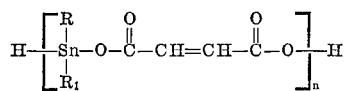

and

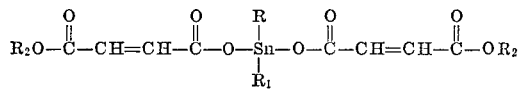

wherein $n$ is a finite integer equal to at least 1, R and $R_1$ are defined as hereinabove and $R_2$ is a monovalent hydrocarbon radical.

The maleates with the first mentioned formula are polymeric in structure, being derived generally from dialkyl tin starting materials and maleic acid or anhydride. Especially convenient in the instantly contemplated compositions is dibutyl tin maleate, since it is readily available commercially. The maleates with the second mentioned formula are generically dialkyl tin esters of maleic acid half esters. The maleic acid half esters are derived from alcohols containing from 1 to 18 carbon atoms, such as methanol, ethanol, propanol, hexanol, octanol, 2-ethyl-hexanol, dodecanol, hexadecanol, octadecanol, and the like. Among the illustrative maleates can be mentioned dibutyl tin bis-(mono-2-ethylhexyl maleate) and dibutyl tin bis (mono-lauryl maleate). These stabilizers are readily available commercially or can be prepared by methods familiar to those skilled in the art. In this connection, illustrative teachings can be found in Quattlebaum, U.S. 2,307,157 and in reference cited in Smith, op. cit. pages 3–5, inc.

The stabilized plastic compositions of the instant invention may be prepared by incorporating the stabilizer mixtures into vinyl resins, which may contain plasticizers, fillers, pigments, dyes, ultraviolet absorbing agents, densifying agents, and other additives in addition to the resins, by admixing in an appropriate mill or mixer or by any of the well known methods which provide for uniform distribution through the plastic compositions.

The stabilizer mixtures may be advantageously employed in concentrations of as little as about 0.01% by weight of the resin or as much as about 10%. Ordinarily, however, concentrations of from about 0.01% to 5% are preferred for reasons of economy, greater concentrations providing relatively little additional benefit.

In addition, to the novel stabilized plastic compositions set forth hereinabove, the instant invention also contemplates novel stabilizing mixtures comprising a sulfur-containing organo-tin compound and from 1 to 4 parts by weight of an organo-tin maleate based on the weight of said compound.

Said sulfur containing compound being a substance of the formula

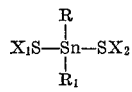

Said maleate being selected from the group consisting of compounds of the formulae

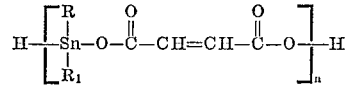

and

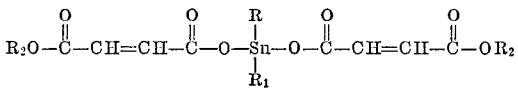

wherein $n$ is a finite integer equal to at least one;

$X_1$ and $X_2$ are each selected from the group consisting of $-COR_3$; aryl, alkaryl and aralkyl of from about 6 to 9 carbon atoms; alkyl and alkenyl bearing up to 3 substituents each selected from the group consisting of hydroxy, alkyloxy, alkylthio, carboxy and carbalkyloxy, each of said alkyl and alkenyl groups containing up to about 18 carbon atoms;

And R, $R_1$, $R_2$ and $R_3$ are each selected from the group consisting of alkyl and alkenyl of up to about 18 carbon atoms, and aryl, alkaryl and aralkyl of from about 6 to 9 carbon atoms. Particularly effective as stabilizers are embodiments wherein R and $R_1$ are butyl and $X_1$ and $X_2$ are phenylcarbonyl, carbo-2-ethylhexyloxy-methyl, and dodecyl, respectively, and wherein R and $R_1$ are butyl and $R_2$ is 2-ethylhexyl.

The following examples are illustrative of the novel compositions of this invention. They are intended to be illustrative only, and are not to be construed as limiting in any manner whatsoever.

EXAMPLE I

Plastic compositions are made with the following ingredients in parts by weight:

| Composition | A | B | C | D |
| --- | --- | --- | --- | --- |
| Polyvinyl chloride | 100 | 100 | 100 | 100 |
| Stabilizer: | | | | |
| Dibutyl tin bis-laurlymercaptide | | 2.0 | | 1.0 |
| Dibutyl tin maleate | | | 2.0 | 1.0 |
| Lubricant, stearic acid | 0.5 | 0.5 | 0.5 | 0.5 |

The ingredients are mixed together, then compounded on a plastics mill for 4 minutes at 171° C. The hot batches are sheeted off at a thickness of about 0.050 inch and samples of the sheeted stocks are heated at 180° C. in a circulating air oven. The color of the samples is observed when they are taken off the mill and at 15 minute intervals in the oven:

Composition:         Observation

A ------- Amber off the mill; black at 15 minutes.

B ------- White off the mill; light yellow at 15 min.; amber at 75 min.; light brown at 120 minutes.

C ------- White off the mill; light yellow at 45 min.; amber at 120 min.; dark brown at 150 minutes.

D ------- White off the mill; white at 60 minutes; very slightly yellow at 75 min.; amber at 165 min., becomes brown at 180 minutes.

Thus, it is seen that the composition D, which is within the scope of the instant invention, exhibits enhanced heat stability when compared with compositions stabilized with the maleate alone (C) and with the sulfur-containing stabilizer alone (B). Especially noteworthy is the observation that even after 60 minutes at these high temperatures composition D remains white, while the others are, at best, yellow and, at the worst, black (A). The synergistic effect is thus demonstrated.

EXAMPLE II

Plastisol-type resin compositions are made with the following formulations:

| Composition | E | F | G | H |
|---|---|---|---|---|
| Polyvinyl chloride | 20 | 20 | 20 | 20 |
| Stabilizer: | | | | |
| Dibutyl tin bis-2-ethylhexylthioglycolate | 0.4 | 0 | 0.2 | |
| Dibutyl tin maleate | | 0 | 0.4 | 0.2 |
| Plasticizer, dioctyl phthalate | 80 | 80 | 80 | 80 |

The ingredients are mixed together until homogeneous and placed in tubes. The tubes are immersed in a bath at 180° C. and the compositions are observed for color changes at 15 min. intervals.

It is found that composition E, the unstabilized resin, has become dark red in 15 minutes; the composition stabilized only with the sulfur compound F has turned amber in 75 minutes; the composition stabilized only with the maleate G also has become amber in 75 minutes; but the composition with both stabilizers together H remains colorless even at 90 minutes. Thus the combination of stabilizers provides a composition with better resistance to heat than is provided by either alone.

EXAMPLE III

Plastic compositions with the following formulations are prepared:

| Composition | I | J | K | L | M | N | O | P | Q | R | S |
|---|---|---|---|---|---|---|---|---|---|---|---|
| Polyvinyl chloride | 100 | 100 | 100 | 100 | 100 | 100 | 100 | 100 | 100 | 100 | 100 |
| Stabilizer: | | | | | | | | | | | |
| Dibutyl tin bis-(2-ethylhexyl thioglycolate) | 2 | | | | 1 | 1 | | | | | .95 |
| Dibutyl tin bis-lauryl mercaptide | | 2 | | | | | | | 1 | .66 | |
| Dibutyl tin bis-thiobenzoate | | | 2 | | | | | 1 | | | |
| Dibutyl tin bis-(mono-2-ethylhexyl maleate) | | | | 2 | | 1 | 0.5 | | | .66 | .95 |
| Dibutyl tin maleate | | | | | 2 | | 0.5 | 1 | 1 | .66 | 10 |

The ingredients are mixed with 0.5 part of stearic acid per 100 parts of polyvinyl chloride then milled on a plastics mill for 4 minutes at 171° C. Samples of the sheeted stocks are heated at 180° C. in a circulating air oven and observations of the color are made at 30 minute intervals, for a maximum of 150 minutes:

Composition:      Observation
I ___ White initially; yellow within 30 minutes; remains yellow.
J ___ Amber during 120 min.; becomes black before end of 150 min.
K ___ Becomes yellow within 30 min.; remains yellow throughout.
L ___ White initially; becomes yellow at 60 min.; becomes amber at 120 min.
M ___ White initially; becomes yellow at 60 min.; is amber at 150 min.
N ___ White initially; becomes yellow at 90 min.; remains yellow throughout.
O ___ White initially; becomes yellow at 120 min.
P ___ Do.
Q ___ Remains white for entire 150 min.
R ___ Do.
S ___ White initially; becomes yellow at 120 min.

Thus it is found that those compositions containing both sulfur-containing organo-tin and organo-tin maleate stabilizers exhibit better heat stability than those containing equal amounts of only the individual types, I, J and K, and L and M, respectively. The compositions stabilized in accordance with the instant invention, N through S, inclusive, remain white longer and, in fact, two Q and R, remain white even to the end of the 150 minute heating period.

EXAMPLE IV

The procedure of Example I is repeated substituting for the vinyl chloride resin the following halogenated hydrocarbon resins, including copolymers of vinyl chloride:
vinyl chloride-vinylacetate copolymer (88:12)
vinyl chloride-vinylacetate copolymer (96:4)
vinyl chloride-2-ethylhexylacrylate copolymer (80:20)
vinyl chloride-vinylidene chloride copolymer (90:10)
vinyl chloride-acrylonitrile copolymer (90:10)
polychlorobutadiene
chlorinated polyethylene
polydichlorostyrene
chlorinated rubber It is found that compositions with better stability to heat and light are obtained with the mixture of stabilizers than are obtained with either alone.

EXAMPLE V

Plastic compositions of the following type are formulated:

| Composition | T | U | V | W | X | Y | Z | AA | BB |
|---|---|---|---|---|---|---|---|---|---|
| Polyvinyl chloride | 100 | 100 | 100 | 100 | 100 | 100 | 100 | 100 | 100 |
| Stabilizer: | | | | | | | | | |
| Dibutyltin bis-(2-ethylhexyl-thioglycolate) | 2.0 | 1.333 | 1.0 | 0.666 | 0.50 | 0.40 | 0.333 | 0.286 | 0.0 |
| Dibutyltinmaleate | 0.0 | 0.666 | 1.0 | 1.333 | 1.50 | 1.60 | 1.666 | 1.714 | 2.0 |

The ingredients are mixed together, then compounded on a plastics mill for 4 minutes at 176–177° C. The hot batches are sheeted off at a thickness of about 0.050 inch and samples of the sheeted stocks are heated at 180° C. in a circulating air oven. The color of the samples is observed when they are taken off the mill at 15 or 30 minute intervals in the oven:

Composition:      Observation
T ___ White off the mill; light brown at 120 min.; dark brown at 135 minutes.
U ___ White off the mill; light brown at 165 min.; dark brown at 180 minutes.
V ___ White off the mill; light brown at 180 min.; dark brown at 210 minutes.
W ___ White off the mill; light brown at 195 min.; dark brown at 225 minutes.
X ___ Do.
Y ___ Do.
Z ___ White off the mill; medium brown at 195 min.; dark brown at 210 minutes.
AA ___ Do.
BB ___ White off the mill; blackening at 135 min.; black at 165 minutes.

Thus, it is found that compositions V, W, X and Y which contain the mixed stabilizers in sulfur-maleate ratios of 1 to 1; 1 to 2; 1 to 3; and 1 to 4, respectively, are markedly superior to compositions T, U, Z, AA and BB, which contain equal amounts of the organo-tin sulfur stabilizer alone; the mixed stabilizers at sulfur-maleate ratios of 1 to 0.5, 1 to 5, 1 to 6 and the maleate stabilizer alone. The synergistic effect resides in compositions V, W, X and Y in which for each part of sulfur-stabilizer there is present from 1 to 4 parts by weight of the maleate.

EXAMPLE VI

Compositions with stability to heat and light enhanced over that obtainable with equal amounts of either stabilizer alone are obtained by adding to polyvinyl chloride from about 0.5 to 10 parts by weight of mixtures of the following stabilizers, I and II, the mixture containing for each part of the sulfur stabilizer (I) from 1 to 4 parts of the maleate (II).

We claim:
1. A stabilizing mixture consisting essentially of dibutyltin bis-(2-ethylhexyl thioglycolate) and from about 1 to 4 parts by weight of dibutyltin maleate for each part by weight of said thioglycolate.
2. A polyvinyl chloride resin stabilized against heat and light with about 2% by weight, based on the weight of polyvinyl chloride present, of the stabilizing mixture of claim 1.

I.

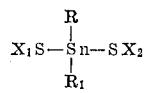

| R | $R_1$ | $X_1$ | $X_2$ |
|---|---|---|---|
| $CH_3$ | $CH_3$ | $CH_2(CH_2)_{10}CH_3$ | $CH_2(CH_2)_{10}CH_3$ |
| $n-C_4H_9$ | $n-C_4H_9$ | $CH_2(CH_2)_6CH_3$ | $CH_2(CH_2)_6CH_3$ |
| $CH_2(CH_2)_6CH_3$ | $CH_2(CH_2)_6CH_3$ | $CH_2(CH_2)_{16}CH_3$ | $CH_2(CH_2)_{10}CH_3$ |
| $CH_2CH=CHCH_3$ | $CH_2CH=CHCH_3$ | $CH_2(CH_2)_{16}CH_3$ | $CH_2(CH_2)_{10}CH_3$ |
| $n-C_4H_9$ | $n-C_4H_9$ | $CH_2(CH_2)_7CH=CH(CH_2)_7CH_3$ | $CH_2(CH_2)_7CH=CH(CH_2)_7CH_3$ |
| $CH_2(CH_2)_{16}CH_3$ | $CH_2(CH_2)_{16}CH_3$ | $C_6H_5$ | $C_6H_5$ |
| $n-C_4H_9$ | $n-C_4H_9$ | $CH_2C_6H_5$ | $CH_2C_6H_5$ |
| $n-C_4H_9$ | $n-C_4H_9$ | $C_6H_3(CH_3)_3$ | $C_6H_3(CH_3)_3$ |
| $n-C_4H_9$ | $n-C_4H_9$ | $CH_2CO_2H$ | $CH_2CO_2H$ |
| $n-C_4H_9$ | $n-C_4H_9$ | $CH_2(CH_2)_{10}CO_2H$ | $CH_2(CH_2)_{10}CO_2H$ |
| $n-C_4H_9$ | $n-C_4H_9$ | $C(CO_2H)=CHCO_2H$ | $C(CO_2H)=CHCO_2H$ |
| $n-C_4H_9$ | $n-C_4H_9$ | $CH_2CH_2OH$ | $CH_2CH_2OH$ |
| $n-C_4H_9$ | $n-C_4H_9$ | $CH_2CH_2OCH_2CH_2OH$ | $CH_2CH_2OCH_2CH_2OH$ |
| $n-C_4H_9$ | $n-C_4H_9$ | $CH_2CH(OH)CH_2OH$ | $CH_2CH(OH)CH_2OH$ |
| $n-C_4H_9$ | $n-C_4H_9$ | $CH_2CH(OH)CH(OH)CH_2OH$ | $CH_2CH(OH)CH(OH)CH_2OH$ |
| $n-C_4H_9$ | $n-C_4H_9$ | $CH_2CH_2SCH_2CH_2OH$ | $CH_2CH_2SCH_2CH_2OH$ |
| $n-C_4H_9$ | $n-C_4H_9$ | $CH(C_{16}H_{33})CO_2H$ | $CH(C_{16}H_{33})CO_2H$ |
| $n-C_4H_9$ | $n-C_4H_9$ | $CH_2CO_2CH_2(CH_2)_{16}CH_3$ | $CH_2CO_2CH_2(CH_2)_{16}CH_3$ |
| $n-C_4H_9$ | $n-C_4H_9$ | $CH_2CO_2CH_3$ | $CH_2CO_2CH_3$ |
| $n-C_4H_9$ | $n-C_4H_9$ | $COCH_3$ | $COCH_3$ |
| $n-C_4H_9$ | $n-C_4H_9$ | $COC_6H_5$ | $COC_6H_5$ |
| $n-C_4H_9$ | $n-C_4H_9$ | $CO(CH_2)_{10}CH_3$ | $CO(CH_2)_{10}CH_3$ |
| $n-C_4H_9$ | $n-C_4H_9$ | $CO(CH_2)_{16}CH_3$ | $CO(CH_2)_{16}CH_3$ |
| $n-C_4H_9$ | $n-C_4H_9$ | $COCH_2C_6H_5$ | $COCH_2C_6H_5$ |
| $n-C_4H_9$ | $n-C_4H_9$ | $COC_6H_4(CH_3)_3$ | $COC_6H_4(CH_3)_3$ |
| $n-C_4H_9$ | $n-C_4H_9$ | $CO(CH_2)_7CH=CH(CH_2)_7CH_3$ | $CO(CH_2)_7CH=CH(CH_2)_7CH_3$ |
| $n-C_4H_9$ | $n-C_4H_9$ | $CH_2(CH_2)_{10}CH_3$ | $CH_2CO_2CH_2(CH_2)_{10}CH_3$ |
| $n-C_8H_{17}$ | $n-C_4H_9$ | $CH_2(CH_2)_{10}CH_3$ | $CH_2(CH_2)_{10}CH_3$ |
| $n-C_4H_9$ | $n-C_4H_9$ | $COC_6H_5$ | $CH_2(CH_2)_{10}CH_3$ |
| $n-C_4H_9$ | $n-C_4H_9$ | $COC_6H_5$ | $CH_2CO_2CH_2CH(C_2H_5)(CH_2)_3CH_3$ |
| $n-C_4H_9$ | $n-C_6H_{13}$ | $CH_2(CH_2)_{10}CH_3$ | $COC_6H_5$ |
| $C_6H_5$ | $C_6H_5$ | $CH_2(CH_2)_{10}CH_3$ | $CH_2(CH_2)_{10}CH_3$ |
| $CH_2C_6H_5$ | $CH_2C_6H_5$ | $CH_2(CH_2)_{10}CH_3$ | $CH_2(CH_2)_{10}CH_3$ |
| $C_6H_2(CH_3)_3$ | $C_6H_2(CH_3)_3$ | $CH_2(CH_2)_{10}CH_3$ | $CH_2(CH_2)_{10}CH_3$ |

II.

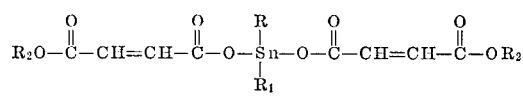

| R | $R_1$ | $R_2$ |
|---|---|---|
| $CH_3$ | $CH_3$ | $CH_2(CH_2)_{10}CH_3$ |
| $n-C_4H_9$ | $n-C_4H_9$ | $CH_3$ |
| $n-C_4H_9$ | $n-C_4H_9$ | $CH_2(CH_2)_{16}CH_3$ |
| $n-C_{18}H_{37}$ | $n-C_{18}H_{37}$ | $CH_2(CH_2)_6CH_3$ |
| $n-C_4H_9$ | $n-C_4H_9$ | $CH_2(CH_2)_7CH=CH(CH_2)_7CH_3$ |
| $CH_2CH=CHCH_3$ | $CH_2CH=CHCH_3$ | $CH_2CH(C_2H_5)(CH_2)_3CH_3$ |
| $C_6H_5$ | $C_6H_5$ | $CH_2(CH_2)_6CH_3$ |
| $CH_2C_6H_5$ | $CH_2C_6H_5$ | $CH_2(CH_2)_6CH_3$ |
| $C_6H_2(CH_3)_3$ | $C_6H_2(CH_3)_3$ | $CH_2(CH_2)_6CH_3$ |
| $n-C_4H_9$ | $n-C_8H_{17}$ | $CH_2(CH_2)_{10}CH_3$ |

References Cited

UNITED STATES PATENTS 2,307,157   1/1943   Quattlebaum _____ 260—45.75
2,914,506   11/1959  Mack et al. _____ 260—48.75

DONALD E. CZAJA, Primary Examiner

V. P. HOKE, Assistant Examiner

U.S. Cl. X.R.

252—406